Figure 1A:
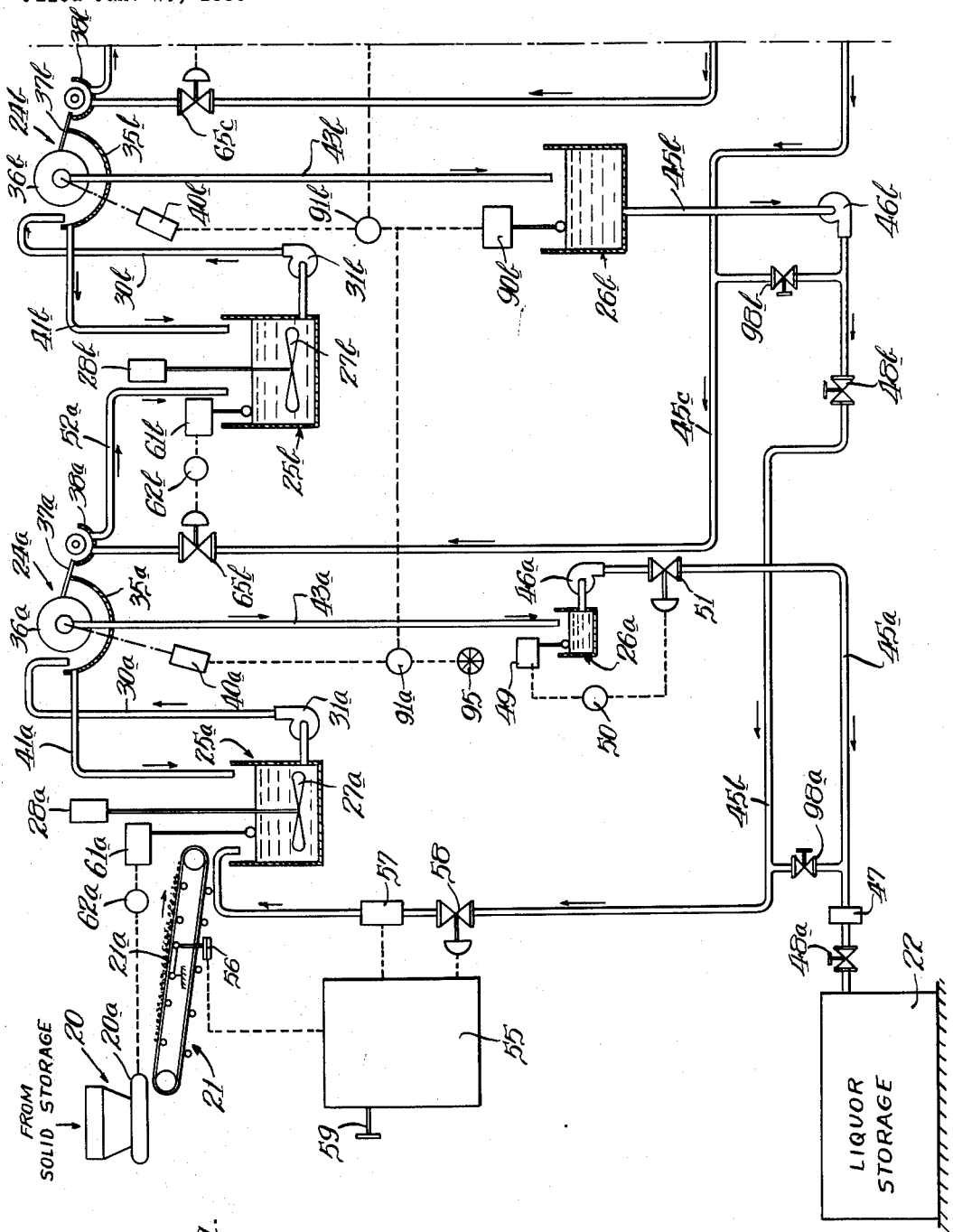

INVENTOR.
Robert H. Berg
BY Ernest V. Haines
Atty.

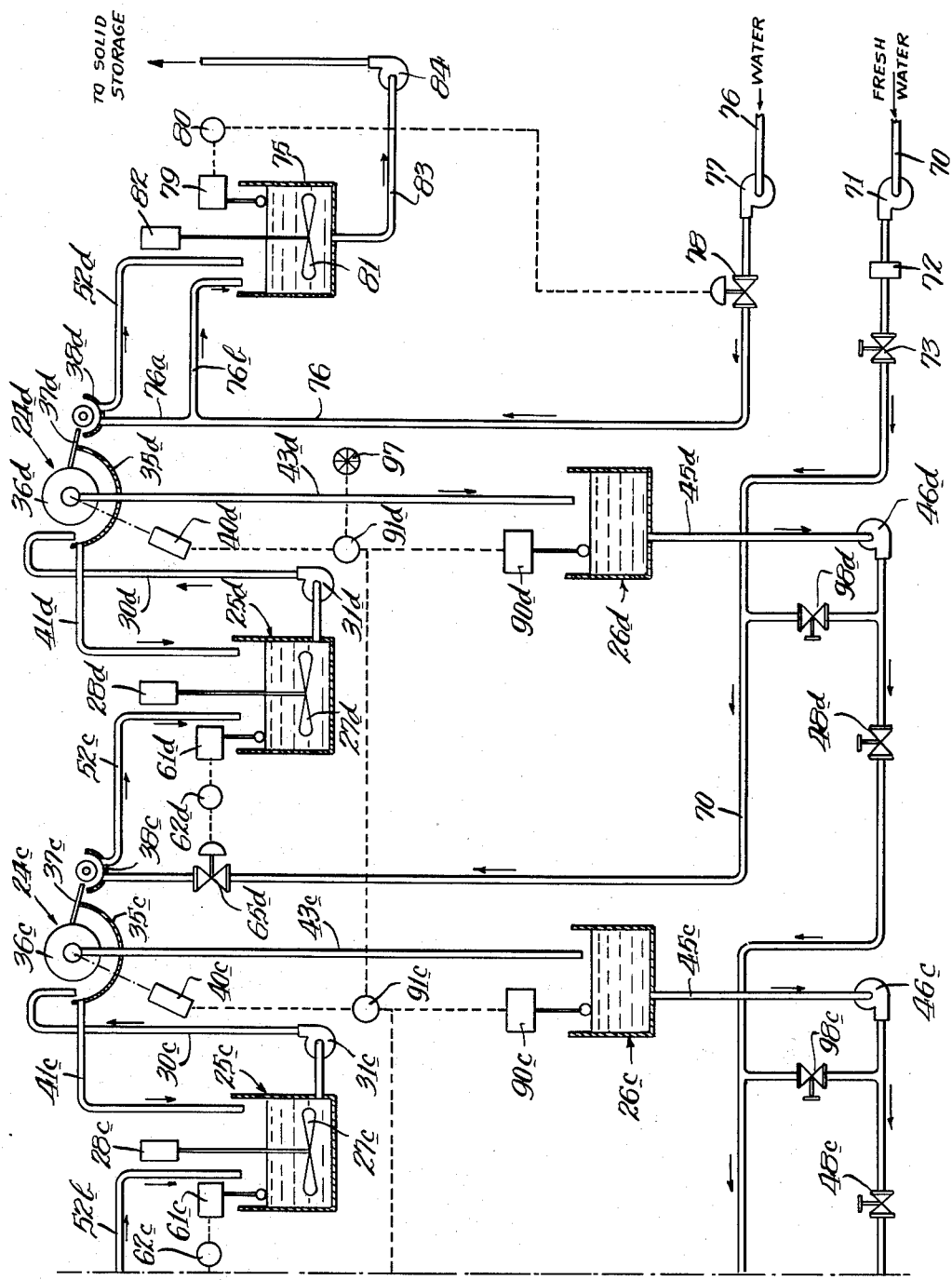

United States Patent Office 2,738,258
Patented Mar. 13, 1956

2,738,258

CONTROL MEANS FOR COUNTERFLOW MULTISTAGE PROCESS

Robert H. Berg, Elmhurst, Ill., assignor to International Minerals & Chemical Corporation, a corporation of New York Application January 23, 1953, Serial No. 332,986

6 Claims. (Cl. 23—270)

The present invention relates to an improved control means for a counterflow multistage process, and, more specifically, to improved automatic control means for a counterflow process wherein not only are the proportions of materials used in the proces maintained constant, but means are provided to maintain the equipment utilization at a maximum with inventories throughout the process being maintained in correct relationship.

The counterflow multistage process is used extensively in industry for many purposes. It is used in the soap industry for manufacturing soap. It is used in the sugar beet industry for extracting sugar from sugar beets. It is also used in the ore extraction industry for extracting certain mineral or chemical elements. In general, such a counterflow process consists of separating out in a series of successive stages more and more of a desired material which is to be extracted from a subtance containing a percentage of the desired material. In such a process the source material moves in one direction from a supply, and in successive stages the material to be extracted, whether it be sugar, a chemical element or the like, is successively leached from the source material so that at one end of the process the spent source material is disposed of. Moving in the opposite direction, there may be a material in the form of a solvent or a chemical reagent such as water which is successively enriched with the material extracted from the source material as it moves through the stages in a direction toward the point where the source material enters.

In such a counterflow process it is conventional to use mixing units, separating units in the form of filters, centrifuges, etc., and surge or storage units, which units could be separate or integral in any combination. A stage in such process will include the mixing, separating and storage functions of said units. It will be recognized that the various units, and particularly the separating units which frequently are the "bottleneck" of such a system, operate differently in the different stages for numerous reasons. The reason that the separating units are the bottleneck is because the separating function is more complex than storing or mixing functions. Some one of the separating units at any given time will likely be the bottleneck of the system. The reasons for this are several. In the first place, there are numerous differences in the properties of the materials in process at different stages. Additionally, changes in processing ability, because of wear and usage, also occur.

It would be desirable to provide a system of the above-mentioned type in which the various units such as the mixing units, the separating units and the storage units all are provided with means for controlling the inventory of process materials so that no units would run dry or overflow. Moreover, it would be desirable to maintain accurate control of the proportions of the materials entering the process. Additionally, it would be desirable to provide an arrangement in which the system operated at its maximum throughput rate; in other words, the system operated so that all stages thereof were paced to the maximum rate of the slowest stage, and that this was the case even though the slowest stage might be a different one from time to time. In effect, it would be desirable to provide a system in which a sort of "automatic whip" were applied to the system to cause it to operate continually with the maximum throughput rate while maintaining constant the inventory, and, of course, maintaining an accurate proportion of the process materials moving through the various stages of the system by the counterflow process.

Accordingly, it is an object of the present invention to provide an improved control arrangement for a multistage counterflow process.

It is another object of the present invention to provide in a multistage counterflow process automatic flow and inventory controls which will result in the maximum efficiency of the apparatus as a whole, even though various portions of the apparatus may become the bottleneck at different times insofar as the throughput rate of the apparatus is concerned.

It is a further object of the present invention to provide improved automatic inventory control means in connection with a manufacturing process involving counterflow multistage operation.

Still another object of the present invention resides in the provision of simple control means for not only maintaining a proper proportion between the materials moving through apparatus in a counterflow multistage process, but simultaneously maintaining inventories throughout the system.

A still further object of the present invention resides in the provision of means for automatically pacing the stages of a counterflow multistage process to the maximum rate of the slowest stage in the process, even though the slowest stage may differ from time to time.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which Figs. 1a and 1b together define a diagram showing schematically the essential portions of the apparatus and control means involved in connection with the present invention, and also depicting a flow diagram of the counterflow process forming a part of the present invention.

It will be understood by those skilled in the art that the present invention has numerous applications, and, as has been pointed out above, may be used for many purposes. Accordingly, the particular application of the present invention is not important, and it is intended in the present application to claim the apparatus and method of the present invention generally. However, in order to aid in understanding the present invention, one application of the invention will be considered. That application is in connection with the manufacture of phosphoric acid. In the manufacture of phosphoric acid, a treated material in solid form which contains phosphoric acid is mixed with a liquid and in successive stages the solid material is leached of its phosphoric acid content and during this process the liquid is enriched in its phosphoric acid content as it passes through successive stages until a final liquor is obtained in the form of a phosphoric acid solution. In a counterflow extraction process, the most enriched liquor is in contact with the solid having the maximum content of the material to be leached therefrom. The leached solid material, with the phosphoric acid substantially removed therefrom, could be termed the waste product of this particular process.

Referring now to Fig. 1a of the drawings, where one end of the multistage process is illustrated, it may be noted that the raw solid material is supplied to the hopper of a suitable device schematically indicated at 20, which is a feeding device for supplying this solid material from a storage source, not shown, to a conveyor generally indicated at 21 which introduces the solid material to the first stage of the process. Many of the elements of each stage are identical from stage to stage, and, hence, throughout the description the same reference numerals will be applied to the corresponding elements in the different stages, except that an appropriate subscript such as "a," "b," "c" and "d" will be applied to designate the particular stage involved. From the same end of the system to which the raw solid is supplied, there is obtained the end product which it is desired to obtain, namely, the liquor rich in the material leached from the solid, such as a phosphoric acid solution, in the particular application described by way of example. As illustrated, a liquor storage tank or means 22 is provided for storing therein the enriched liquor which is the desired end product. It will be understood that the first stage of the system might be designated at either end thereof, since the stage where the raw solid is supplied is the first stage as far as supplying the solid material is concerned, but is the last stage when one considers the other material in the counterflow process. The same statement could be made with reference to the other end of the system. Consequently, the stages will be considered with reference to the stage adjacent the solid input as stage one by way of explanation, although it should be understood that the opposite method of terming the stages could be employed.

Considering, then, the first stage of the process, it includes generally a separating unit, specifically illustrated as a filter unit, designated by the reference numeral 24a, a mixing unit designated by the reference numeral 25a, and a small surge tank or pump box 26a connected to the output of the filter unit. Although the individual elements employed in the apparatus of the present invention may have any suitable construction and form no part of the present invention, in order better to understand the control arrangement a brief discussion of the apparatus will be included. The mixing unit schematically indicated at 25a preferably comprises a tank in which liquids or solids are mixed by any suitable mixing means such as a schematically indicated mixer 27a driven by a motor or other suitable prime mover 28a. In this mixing tank the liquids and solids supplied thereto are mixed together to form a slurry which can be pumped through the process. Actually, it may be desirable to replace the mixing tank 25a with two adjacent mixing tanks with the solids and liquids inserted into the first tank, and the second tank receiving the slurry or mixture in a manner to eliminate the possibility of lumps or short-circuiting of the slurry. As illustrated in the drawings, the output from mixing tank 25a is connected by a suitable conduit 30a with the filter unit 24a. A suitable pump 31a may be included in this fluid or slurry circuit to cause the necessary flow, and to permit the filter unit 24a to be disposed physically above the mixing tank 25a.

Although the filter unit 24a may comprise any well-known type of commercial filter, it is schematically illustrated as of the type comprising a filter bowl 35a within which is rotatably mounted a rotating filter unit generally designated at 36a, which may comprise a series of hollow disks covered with filter cloths with suitable vacuum means for sucking the liquid through the filter cloths into the hollow space in the disks and depositing a filter cake on the exterior of the rotating filters, which cake is removed by suitable means and transferred by means generally indicated at 37a to a repulping unit 38a, wherein the removed cake from the filter elements 36a is mixed with liquid from the stage designated as $(n+2)$, where $n$ is the stage being considered, to form a new slurry to go on to the next stage of the system. The rotatable filter unit 36a is illustrated as being connected with a suitable driving means or prime mover 40a which preferably comprises an electric motor or the like. To insure proper operation of the filter unit by maintaining the associated filter bowl 35a full of slurry, the filter bowl 35a is connected by an overflow pipe 41a with a mixing tank 25a.

The liquor separated from the cake in the filter unit 24a, having passed through the filter cloths associated therewith, is led off through a suitable conduit 43a to the surge or storage tank 26a mentioned above. The latter may be disposed at a level far enough below that of the filter unit to employ a barometric seal for the vacuum, which method of maintaining such seal is commonly employed in such filter processes. The construction or arrangement of this barometric seal, however, forms no part of the present invention, and it is mentioned only to indicate why the surge tank 26a is designated as being located a substantial distance below the filter unit 24a.

In order to dispose of the liquor collected in the surge tank 26a, which, as far as the liquor is concerned, is the last stage in the process, there is provided a suitable conduit 45a leading from the surge tank 26a to the liquor storage 22. This conduit is illustrated as including a suitable pump 46a, a meter or measuring device 47 which merely measures and preferably records the quantity of liquor sent to storage, and a manual shut-off valve 48a which has application when the system is started up, as will become apparent from the ensuing description. To prevent pump and meter troubles, there is associated with the surge tank 26a a suitable liquid level measuring device 49 which has been schematically illustrated as a float actuated device, but which obviously may have numerous other forms. This float actuated measuring device 49 through a suitable controller 50 is indicated as being connected to a suitable valve 51 which is actuated in response to operation of the controller 50 to control the level in tank 26a at some arbitrary set level. The interconnection between the controller 50 and the valve 51 may, obviously, be electrical, pneumatic, hydraulic or the like, but with this arrangement the surge tank 26a may be controlled to maintain substantally a constant liquid level therein and avoid intermittent flow in conduit 45a which could cause pumping and meter troubles.

The second or $(n+1)$ stage where $n=1$, considering the stages beginning with the point where the solid enters the process, is, except for its storage tank 26b, substantially identical with that already described and comprises the filter unit 24b, the mixing tank 25b, the surge tank 26b, and the corresponding elements already described which have the identical reference numeral appended thereto except that the subscript is "b" instead of "a" in all cases. The tank 26a of stage one merely serves as a barometric seal and inlet supply or pump box for pump 46a. The tank 26b, on the other hand, serves likewise as a barometric seal and pump box for pump 46b, but primarily serves as a surge or storage capacity to accommodate fluctuations in the relative performance of stage one and stage two filters, as will be described in greater detail hereinafter. The slurry obtained from the repulper 38a described above is transferred through a conduit 52a into the mixing tank 25b, from which it is supplied to the filter unit 24b. From the filter unit 24b the liquor removed from the slurry passes through the conduit 43b to the surge tank 26b. From the surge tank 26b this liquor is transferred through a conduit 45b to the mixing tank 25a of the first stage. This conduit includes a pump 46b and a manual shut-off valve 48b for the same purpose previously described for corresponding valve 48a.

For the purpose of maintaining an accurate control of the proportions of the process materials in stage one of the process of the present invention, only a single control means, generally designated by the reference numeral 55, is provided. In accordance with the present invention, this ratio controller or proportioning control device 55 provides the desired flow ratio control in stage one between the solids supplied to the process and the liquor entering stage one and mixed therein. The proportioning control means 55 is preferably a standard control instrument capable of continuously controlling the flow proportion of two materials to be used in a process. Such means usually controls the materials as they are supplied to the process by what are termed as "wild" and "captive" lines. Since it is easier accurately to control the flow of a liquid, the solid supplied to the process may be considered as being supplied thereto through the "wild" line, and, as illustrated, the conveyor 21 supplying solid to the mixer tank 25a includes a short section 21a associated with suitable solid flow weighing means designated at 56. This measuring means 56 illustrated as a conveyor scale controller will provide a control impulse to the proportioning control means 55, indicating, in effect, the flow rate of solid supplied to the mixing tank 25a. Similarly, there is provided in the liquor conduit 45b a liquid flow rate measuring means 57 for supplying a measuring impulse to the proportioning control means 55 indicative of the liquid flow rate, whereby it is possible to produce a control impulse for controlling the captive line, so that a constant proportion of liquor will be supplied to the mixing tank 25a with respect to the measured quantity of solid supplied thereto. Preferably the proportioning control means includes manual adjustable means 59 for permitting an operator selectively to control any desired proportion. Thus, a suitable automatic control valve 58 in conduit 45b is automatically controlled by the proportioning control means 55 in response to the impulses received thereby from measuring means 56 and 57.

It is important that the proportion of materials in the process are accurately controlled irrespective of the flow rate of the solid supplied to the mixer tank 25a. Preferably the feeding device 20 includes variable speed means 20a to permit addition of solid material to mixing tank 25a in accordance with the requirements as determined by a level measuring device 61a of any suitable type associated with the mixing tank 25a. As illustrated, the level measuring device through a suitable controller 62a controls the variable speed means 20a. The mixing tanks such as 25a and 25b are for the purpose of beating up the solids to make sure that a suitable slurry which can readily be pumped around the system results, and to introduce the necessary time element for leaching of the solids by the liquor. Actually, if the repulpers 38 provided enough mixing in each stage, which they normally do not do, the mixing tanks such as 25, with the exception of 25a, might be dispensed with. In such case, however, it would still be necessary to have a liquid level controller associated with the filter bowls such as 35 of the filter units 24.

From the above description it is apparent that the ratio controller or proportioning control means 55 automatically proportions the desired mixture for stage one of the process, with this single proportioning control means providing what is wanted at the crucial stage of the process. The ultimate proportion of input solid and input liquid is controlled, as will become apparent from the following description, by reflected level control through the system. It will be apparent that if one controlled the solid input at one end of the process and the liquid or water input at the other end of the process, that by the time the ingredients supplied at any moment reached each other there would have been a substantial time delay. In accordance with the present invention, the proportioning control is provided at the point where the solid first comes into contact with liquor, and the controls at other points in the process function to maintain inventory, thus regulating the proportion of input liquid to the last stage of the process.

The system of the present invention is illustrated as including four filter stages which are all substantially identical with one another. The filter stages not already described are designated by the reference numerals 24c and 24d. A mixing tank 25c is supplied with the output from the repulper 38b, and the liquor output from the filter unit 24c is supplied to a surge tank 26c. The output of the surge tank 26c is supplied to a conduit 45c, which includes a pump 46c and a manual shut-off valve 48c. The conduit 45c leads directly to the repulper unit 38a wherein the liquid from surge tank 26c is supplied to the repulper 38a to be mixed with the filter cake supplied thereto from filter unit 24a. In order to maintain the proper liquid level in the mixing tank 25b, there is provided a level controller 61b similar to the level controller 61a which controls automatically a valve 65b in conduit 45c. Thus, the slurry supplied to mixer tank 25b will be prevented from overflowing the tank. Such controller 61b tends to reduce the difference between the measured liquid level and some arbitrary set level to zero.

In a similar manner, the output from surge tank 26d is supplied through a conduit 45d to the repulper 38b, and the same elements are included in this conduit marked by the subscript "d" as in the conduit 45c already described. With this arrangement the liquid level measuring device 61c and controller 62c associated with the mixing tank 25c will make sure that the slurry level in mixing tank 25c will not exceed a predetermined desired level. Similarly, the level controller 62d associated with mixing tank 25d controls the slurry level in mixing tank 25d by controlling valve 65d.

It will be noted that level controller 62a, which controls variable speed means 20a of feeder 20 to control solid input, which in turn controls liquid input to tank 25a through ratio controller 55 and control valve 58, effectively performs the same function as level controllers 62b, 62c and 62d which control valves 65b, 65c and 65d, respectively, thus controlling liquid input to tanks 25b, 25c and 25d.

With the invention shown in Figs. 1a and 1b of the drawings, a four-stage process has been illustrated. It should be understood that the number of stages could be greater or less. In any event, with a four-stage process the fourth stage becomes the last stage of the process. This stage includes mixing tank 25d. To repulper 38c there is supplied by means of a conduit 70, for the particular application described, fresh water which mixes with the cake or solid from filter unit 24c. Thus, conduit 70 includes a pump 71 and a measuring device 72 for measuring the quantity of input liquid supplied to the system. It will be understood that this measuring device 72 is identical in purpose with the flow measuring device or meter 47, and might be an orifice meter, venturi meter, paddle wheel meter, rotameter or other flow meter. A manual shut-off valve 73 is also included in this conduit 70, as is an automatically controlled valve 65d, which is controlled by the level controller 61d associated with the mixing tank 25d, as described above. It will be apparent that the slurry supplied to mixing tank 25d from the repulper 38c through the conduit 52c contains solid material which has been leached of most of its ingredients which it is desired to extract. The fresh water has, of course, the maximum dissolving power as far as removing ingredients from the solid is concerned, and, hence, should remove substantially all of the remaining ingredients which it is desired to remove.

The solid material formed at the last filter unit 24d is supplied to a repulper 38d from which it goes to a final mixing tank 75 after having been mixed with water from a suitable source, not shown, supplied through a conduit 76. This conduit includes a pump 77 and an automatic control valve 78 which is controlled by a liquid level measuring device 79 and controller 80 associated with the mixing tank 75 to prevent it from overflowing or running dry. The slurry that is supplied to tank 75 from repulper 38d might be considered a waste product, or at least a by-product of the process, and means are provided to move this by-product to some dump or storage place, as the case may be. Mixing tank 75 is indicated as having a suitable agitator or paddle wheel 81 associated therewith driven by a suitable motor 82. In general, the quantity of water supplied to this last mixing tank in no way affects the process and is merely supplied for the purpose of getting the waste material removed in the desired manner. Accordingly, conduit 76 includes a portion 76a going to the repulper 38d and a by-pass portion 76b which by-passes the repulper 38d and enters mixing tank 75. Generally, much more water is supplied through by-pass 76b than is supplied through conduit portion 76a. The output from tank 75 is supplied to a conduit 83 by means of a pump 84 to any suitable dump, storage place or the like, depending upon what is to be done with the leached out solid.

From the above description it will be apparent that at least two conditions have been taken care of. In the first place, the mixing tank inventories have been maintained correctly by virtue of the level measuring devices 61 and associated controllers 62. Additionally, the proportion of solid and liquid in the process has been maintained correctly by using (1) proportioning control means 55 at stage one, or, in other words, at the critical point in the process, and (2) by employing successive liquid level controllers throughout the remainder of the process. Thus, with the arrangement described heretofore, means are provided to satisfy inventory and proportion control needs at the various stages of the process, with the exception of inventory control on surge or storage tanks 26b, 26c and 26d.

In accordance with the present invention, it is desirable that the throughput rate of the over-all process is made to be the maximum whereby maximum equipment utilization is obtained. It will be apparent that the mixing tanks and surge tanks will not be the bottleneck in the system because sufficiently large pumps can be employed to pump the material through the system as rapidly as desired. The actual bottleneck in systems of the type described will always be found in one of the filter units 24, and it is desired in accordance with the present invention to get the maximum utilization from the various filter units 24. It will be appreciated that even though the filter units 24 are produced by mass production methods so that, essentially, each is like every other one, nevertheless, there will be small differences. It will be appreciated, moreover, that much greater differences in operation will result by virtue of the fact that these filters are used in different stages of the process, and the slurry and the liquor in different stages of the process differ substantially. Moreover, the filters are mechanical devices subject to the usual mechanical defects and needs for repair, and at various times certain ones of the filters or certain portions thereof will not be as effective as at other times. At any given time, therefore, one of the filters 24 is going to be the bottleneck of the system, and it is desired in accordance with the present invention to operate the system at the maximum capacity, as determined by this bottleneck.

It will be understood that the capacity of filter units 24 can be controlled in several ways such as by varying the degree of vacuum applied thereto, varying the slurry level maintained in bowl 35, or varying the speed of rotation of the rotatable portion 36 thereof by controlling the speed of motive means 40. The latter lends itself to most efficient and convenient operation, and, in accordance with the present invention, motive means 40 are equipped with means for automatic speed control.

Referring now to one of the stages of the process such as the second stage where the elements thereof are marked by the subscript "b," it will be observed that the true limit on the input to surge tank 26b is the capacity of filter unit 24b. As illustrated in the drawings, surge tank 26b is provided with a level measuring device 90b which transmits a measurement impulse to suitable control means 91b which in turn regulates the speed of motive means 40b and, hence, speeds up or slows down the separating function of filter 24b in dependence upon the level of the material in surge tank 26b. Similarly, the surge tank 26c is provided with a level measuring device 90c which transmits a measurement impulse to suitable control means 91c which in turn regulates the speed of motive means 40c associated with filter unit 24c. Likewise, a level measuring device 90d associated with surge tank 26d transmits a measurement impulse to suitable control means 91d which in turn regulates the speed of motive means 40d associated with filter 24d. By virtue of the means described for controlling the levels in surge tanks 26b, 26c and 26d, there has now been provided complete inventory control for the entire system with the possible exception that surge tanks 26b, 26c and 26d could run dry.

In the arrangement thus far described comprising a four-stage process, it will be apparent that the four variable speed filter units 24 effectively provide control means for the levels of four surge tanks by controlling the input to these surge tanks. Actually, however, in the process described there are only three surge tanks, the levels of which need be controlled in this manner, namely, tanks 26b, 26c and 26d. These tanks are provided with level measuring devices 90b, 90c and 90d, respectively, as described above, which transmit their measured signals to controllers 91b, 91c and 91d, respectively. Thus, the controller 91a for the first filter unit 24a is not provided with a measured signal such as that provided by the measuring devices 90, since there is no surge tank from which process material is to be supplied to a filter unit in the system preceding unit 24a. In accordance with the present invention, there is provided for the controller 91a of the first stage an arbitrary signal from means 95 which is representative of a measurement from a hypothetical tank corresponding to the surge tanks 26b, 26c and 26d.

With the above description it will be apparent that the levels in surge tanks 26b, 26c and 26d will tend to be maintained at some controlled level. However, as noted above, one or more of these tanks could run dry under certain conditions even though means are provided to prevent them from overflowing. In order to prevent these tanks from running dry and to interrelate the levels of all the surge tanks 26b, 26c and 26d, the controllers 91a, 91b, 91c and 91d are of the type which produce a control function representative of the difference between two quantities. This is a conventional type controller which might be termed a "difference eliminator" and which is similar to the other controllers 50, 61 and 80 already described above. Such controllers operate by measuring one variable, comparing this measurement with a desired condition or set point, and producing an output which depends upon the difference found in this comparison, and which output is utilized to reduce the difference to zero, or, in other words, cause the measured variable to equal the desired or set point condition. The set point of controllers 50, 61 and 80 is manually fixed, but obviously it could be automatically fixed or variable. With the present invention the level in the surge tank 26 of any stage which is controlled by the operation of the filter unit of that same stage also supplies the set point signal for the level of the surge tank of the preceding stage. Since there is no stage preceding stage one, tank 26a does not enter into the picture in this respect. Thus, the level of surge tank 26c automatically supplies a set point control signal to the controller 91b of the preceding stage surge tank 26b. Likewise, the level of surge tank 26d provides the set point signal for the preceding stage controller 91c. Also, the level of surge tank 26b supplies a set point signal to controller 91a. Since controller 91d is the controller of the last stage, there is no succeeding stage surge tank level to provide the necessary set point signal for controller 91d. Accordingly, the control means 91d has an arbitrary set point signal supplied thereto by means 97, which could be representative of the liquid level of a hypothetical tank of a succeeding stage. Thus, there has been provided a control system involving controllers 91 which is completely symmetrical, each controller being provided with a measured signal representative of the level in the surge tank 26 of the stage involved, or the level in a hypothetical tank in the case of the first stage having no surge tank as such, and each controller being supplied with a set point signal representative of the level in the surge tank of a succeeding stage or a hypothetical tank in the case of the last stage.

It will be apparent that if the arbitrary signals supplied by means 95 and 97 are such as to preclude all the controllers 91 from eliminating the differences between the measured signal and set point signal of each stage within the limits of the variable speed filter units, a sort of "automatic whip" is applied to the system tending to maximize the throughput rate at the maximum speed of the slowest filter unit at any particular instant. The difference between the arbitrary signals supplied by the means 95 and 97 will thus seek out the slowest stage, and with this difference in the right direction will force the controller 91 of the slowest stage to operate with an incorrectible difference between the measured and set point signals. This difference is incorrectible because the associated filter is operated at its maximum operating speed, and even then is incapable of meeting the demand set up. It is necessary to set the level of the hypothetical tank, of which means 95 is representative, at a lower setting than the level of the hypothetical tank of which the means 97 is representative.

The automatic whip feature of the present invention can best be understood by considering an operating situation. Suppose that at a particular instant filter unit 24c is the bottleneck of the system. Also, suppose that means 97 is set to represent a depth of six feet in a hypothetical surge tank, and that means 95 is set to represent a depth of five feet in a hypothetical tank. Further, suppose that at the particular instant under consideration the level measuring device 90d measures a level of six feet in surge tank 26d. Under these considerations it will be apparent that the controller 91d will measure zero difference, and hence will cause filter unit 24d to continue to operate as it has been operating. If the level measuring device 90c in surge tank 26c also measures a depth of six feet, then controller 91c will likewise measure zero difference, and the operation of filter 24c will not be altered. Similarly, if level measuring device 90b measures a depth of six feet in surge tank 26b, controller 91b will also find that a zero difference exists; and, similarly, filter unit 24b will not be altered insofar as its operation is concerned. However, under these conditions, controller 91a will indicate a one foot difference, in that the measured depth of the hypothetical tank is one foot less than the set point depth of tank 26b. Accordingly, controller 91a will tend to reduce this difference to zero by speeding up filter 24a in an attempt to increase the level in the hypothetical tank. The speeding up of filter 24a will, of course, reduce the level in surge tank 26b, whereupon controller 91b will operate to tend to speed up filter 24b to maintain the level in tank 26b. The speeding up of filter 24b will tend to reduce the level in surge tank 26c, with the result that controller 91c will tend to speed up filter 24c, and this process will continue throughout the stages until the maximum throughput rate of the slowest filter, namely, 24c, is attained. Thus, it is apparent that by merely applying different arbitrary settings to means 95 and 97, there is obtained the maximum throughput rate of the system regardless of the particular stage of the system, which may include the bottleneck and which stage may vary from time to time. It will be apparent that if the setting of means 97 were set at a lower value than the means 95, the opposite result would occur and the system would tend to slow down until it stopped due to the tendency of the control means 91 to reduce the differences in level of the measured and set point quantities to zero.

For the purpose of starting up the process, it is desirable to operate each stage independently or short-circuited on itself, and to this end by-pass valves 98a, 98b, 98c and 98d are provided for the various stages. These by-pass valves, when open, and the associated shut-off valves 48 being closed, will provide a circulating path for each stage separated from each adjacent stage. Thus, in starting up the process, the liquor and slurry of each stage will keep circulating within the stage until the desired richness of the liquors and leaching of the solids in the various stages has occurred, when the whole counterflow process is put in operation by closing the by-pass valves 98 and opening the manual shut-off valves 48.

From the above discussion it will be apparent that there has been provided a rather simple control means which will not only maintain a constant proportion in a counterflow process at the most desirable stage of the process, but will maintain constant inventory control and will insure that the maximum throughput rate of the system is attained by operating all components thereof at the maximum rate of the slowest component of the system.

In view of the detailed description included above, the operation of the present invention will be apparent to those skilled in the art.

While there has been illustrated and described what is considered at present to be the preferred system and process of the present invention, it will be understood that numerous changes and modifications will occur to those skilled in the art. Accordingly, it is aimed in the appended claims to cover all such changes and modifications as fall within the true spirit and scope of the present invention.

What is claimed as new and desired to be secured by Letters Patent of the United States is:

1. Multi-stage counterflow apparatus for leaching matter from a first material flowing from the first to the last stage through the apparatus by means of liquid flowing in the opposite direction through the apparatus, each stage of such apparatus including a mixing unit and a separating unit, each stage of such apparatus after the first stage having a surge tank receiving liquid from the separating unit of its respective stage, a separating unit control responsive to a decrease of the liquid level in the surge tank of the last stage below a first selected level for increasing the liquid output rate of the separating unit of the last stage, separating unit controls responsive to a decrease of the liquid level in the surge tank of any intermediate stage below the liquid level in the surge tank of the next succeeding stage for increasing the liquid output rate of the separating unit of such intermediate stage, and a separating unit control responsive to an increase of the liquid level in the surge tank of the second stage above a second selected level for increasing the liquid output rate of the separating unit of the first stage, said first selected level being greater than said second selected level, whereby the liquid output of each separating unit is governed by the maximum liquid output of the slowest separating unit.

2. Multi-stage counterflow apparatus for extracting matter from a first material flowing from the first to the last stage of the apparatus by means of a liquid flowing in the opposite direction through the apparatus, each stage of such apparatus including a mixing unit and a separating unit, each stage of such apparatus after the first stage having a surge tank receiving the liquid from the separating unit of its respective stage, means establishing a first signal representative of a first selected liquid level, means comparing the liquid level in the surge tank in the last stage with said first selected liquid level and operative to increase the liquid output rate of the separating unit of the last stage when the liquid level in the surge tank of such last stage decreases relative to said first selected liquid level, means comparing the liquid level in the surge tank of each intermediate stage with the liquid level in the surge tank of the next succeeding stage and operative to increase the liquid output rate of the separating unit of such intermediate stage when the liquid level in its respective surge tank decreases relative to the liquid level in the surge tank of the next succeeding stage, means establishing a second signal representative of a second selected liquid level, means comparing the liquid level in the surge tank of the second stage with said second selected liquid level and operative to increase the liquid output rate of the separating unit of the first stage when the liquid level in the surge tank of the second stage increases relative to said second selected liquid level, said first selected liquid level being greater than said second selected liquid level.

3. Multi-stage counterflow apparatus for extracting matter from a first material flowing from the first to the last stage of the apparatus by means of a liquid flowing in the opposite direction through the apparatus, each stage of such apparatus including a mixing unit and a separating unit, each stage of such apparatus after the first stage having a surge tank receiving the liquid from the separating unit of its respective stage, means establishing a first signal representative of a first selected liquid level, liquid level responsive means responsive to a decrease in the liquid level in the surge tank of the last stage relative to said first selected liquid level for increasing the liquid output of the separating unit of the last stage, liquid level responsive means responsive to a decrease of the liquid level in the surge tank of each intermediate stage relative to the liquid level in the surge tank of the next succeeding stage for increasing the liquid output of the separating unit of such intermediate stage, means establishing a second signal representative of a second selected liquid level less than said first selected liquid level, and liquid level responsive means responsive to an increase of the liquid level in the surge tank of the second stage relative to said second selected liquid level for increasing the liquid output rate of the separating unit of the first stage.

4. Multi-stage counterflow apparatus for extracting matter from a first material flowing from the first to the last stage through the apparatus by means of a liquid flowing in the opposite direction through the apparatus, each stage of such apparatus including a mixing unit and a separating unit, each stage of such apparatus after the first stage having a surge tank receiving liquid from the separating unit of its respective stage, control means controlling the liquid output rate of the separating unit of each stage, means establishing a first signal representative of a first selected liquid level, the control means for the separating unit of the last stage being responsive to a difference between said first selected liquid level and the liquid level in the surge tank of the last stage for increasing the liquid output rate of the separating unit of the last stage, the control means for the separating unit of each intermediate stage being responsive to a difference between the liquid level in its respective surge tank and the liquid level in the surge tank of the next succeeding stage for increasing the liquid output rate of the separating unit of such intermediate stage; means establishing a second signal representative of a second selected liquid level, the control means for the separating unit of the first stage being responsive to a difference between the liquid level in the surge tank of the second stage and said second selected liquid level for increasing the liquid output rate of the separating unit of the first stage, said first selected liquid level being greater than said second selected liquid level whereby the liquid output rate of all separating units is paced to the maximum liquid output rate of the slowest separating unit.

5. In a multi-stage counterflow apparatus for extracting matter from a first material flowing from the first to the last stage of the apparatus by means of a liquid flowing in the opposite direction through the apparatus, each stage of such apparatus including a mixing unit and a separating unit, each stage of such apparatus after the first stage having a surge tank receiving the liquid from the separating unit of its respective stage, liquid level responsive means responsive to a decrease of the liquid level in the surge tank of an intermediate stage relative to the liquid level in the surge tank of the next succeeding stage for increasing the liquid output rate of the separating unit of such intermediate stage.

6. Multi-stage counterflow apparatus for extracting matter from a first material flowing from the first to the last stage through the apparatus by means of a liquid flowing in the opposite direction through the apparatus, each stage of such apparatus including a mixing unit and a separating unit, each stage of such apparatus after the first stage having a surge tank receiving liquid from the separating unit of its respective stage, means establishing a first signal representative of a first selected liquid level, liquid level responsive means responsive to the difference between said first selected liquid level and the liquid level in the surge tank of the last stage for governing the liquid output rate of the separating unit of the last stage, liquid level responsive means governing the liquid output rate of the separating unit of each intermediate stage and responsive to the difference between the liquid level in its respective surge tank and the liquid level in the surge tank of the next succeeding stage, means establishing a second signal representative of a second selected liquid level less than said first said selected liquid level, and liquid level responsive means responsive to the difference between the liquid level in the surge tank of the second stage and said second selected liquid level for governing the liquid output rate of the separating unit of the first stage.

References Cited in the file of this patent

UNITED STATES PATENTS

| | | |
|---|---|---|
| 1,105,102 | Robinson | July 28, 1914 |
| 1,492,656 | Turrentine | May 6, 1924 |
| 2,044,164 | Gulliksen | June 16, 1936 |
| 2,381,965 | Berry | Aug. 14, 1945 |
| 2,469,293 | Davidson | May 3, 1949 |